United States Patent
Kang et al.

(10) Patent No.: US 9,565,545 B2
(45) Date of Patent: Feb. 7, 2017

(54) METHOD FOR COMMUNICATING BETWEEN WIRELESS DEVICES AND WIRELESS DEVICE USING SAME

(75) Inventors: Seung Hyun Kang, Anyang-si (KR); Han Gyu Cho, Anyang-si (KR); Dong Guk Lim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 14/130,884

(22) PCT Filed: Jul. 13, 2012

(86) PCT No.: PCT/KR2012/005634
§ 371 (c)(1),
(2), (4) Date: Jan. 3, 2014

(87) PCT Pub. No.: WO2013/012222
PCT Pub. Date: Jan. 24, 2013

(65) Prior Publication Data
US 2014/0126417 A1 May 8, 2014

Related U.S. Application Data

(60) Provisional application No. 61/510,079, filed on Jul. 21, 2011, provisional application No. 61/510,080, (Continued)

(51) Int. Cl.
*H04W 8/00* (2009.01)
*H04W 28/04* (2009.01)
*H04W 84/18* (2009.01)

(52) U.S. Cl.
CPC ........... *H04W 8/005* (2013.01); *H04W 28/044* (2013.01); *H04W 84/18* (2013.01)

(58) Field of Classification Search
CPC ..... H04W 8/005; H04W 28/044; H04W 84/18
(Continued)

(56) References Cited

U.S. PATENT DOCUMENTS 7,103,371 B1 * 9/2006 Liu .................. H04L 1/1867
370/348
7,190,686 B1 * 3/2007 Beals .................. H04B 7/2687
370/337
(Continued)

FOREIGN PATENT DOCUMENTS

KR 10-2010-0033929 A 3/2010
KR 10-2011-0083719 A 7/2011

OTHER PUBLICATIONS

QualComm: "FlashLineQ: A Clean Slate Design for Ad Hoc Networks", XP-002660751, X. Wu, May 4, 2010.
(Continued)

*Primary Examiner* — Mohammad Anwar
*Assistant Examiner* — Kokou R Detse
(74) *Attorney, Agent, or Firm* — Dentons US LLP

(57) ABSTRACT

The present invention relates to a method for preventing a peer discovery signal collision, which can occur in a device-to-device (D2D) communication system, and to a wireless device using same. According to one embodiment of the present invention, a method for communicating between wireless devices by using a peer discovery slot is provided. The method comprises the steps of transmitting a first peer discovery signal through a first peer discovery channel that is selected from a plurality of peer discovery channels, receiving a second peer discovery signal that is transmitted by a neighboring wireless device, confirming a second discovery channel, from which the second peer discovery signal is detected, from the plurality of peer discovery channels, and transmitting a feedback signal through a response channel that corresponds to the second peer discovery channel from a plurality of response channels.

8 Claims, 15 Drawing Sheets

Related U.S. Application Data filed on Jul. 21, 2011, provisional application No. 61/544,261, filed on Oct. 6, 2011, provisional application No. 61/544,262, filed on Oct. 6, 2011.

(58) Field of Classification Search
USPC .......................................................... 370/254
See application file for complete search history.

(56) References Cited

U.S. PATENT DOCUMENTS

| | | | |
|---|---|---|---|
| 8,520,586 B1 * | 8/2013 | Husted ................. | H04W 74/08 370/318 |
| 2002/0080750 A1 * | 6/2002 | Belcea ......................... | 370/337 |
| 2003/0012176 A1 * | 1/2003 | Kondylis .............. | H04W 28/16 370/337 |
| 2007/0206554 A1 * | 9/2007 | Laroia et al. ................. | 370/338 |
| 2010/0202400 A1 * | 8/2010 | Richardson et al. ......... | 370/330 |
| 2011/0179799 A1 | 7/2011 | Allam et al. | |

OTHER PUBLICATIONS

"FlashLineQ: A Synchronous Distributed Scheduler for Peer-to-Peer Ad Hoc Networks", X.Wu et al., Sep. 1, 2010.

* cited by examiner

METHOD FOR COMMUNICATING BETWEEN WIRELESS DEVICES AND WIRELESS DEVICE USING SAME

This application is a 35 USC §371 National Stage entry of International Application No. PCT/KR2012/005634, filed on Jul. 13, 2012, and claims priority to U.S. Provisional Application Nos. 61/510,079 filed Jul. 21, 2011, 61/510,080 filed Jul. 21, 2011, 61/544,261 filed Oct. 6, 2011, and 61/544,262 filed Oct. 6, 2011, all of which are hereby incorporated by reference in its entirety.

BACKGROUND OF THE INVENTION

Field of the Invention

The present invention relates to a wireless communication system, and more particularly, to a method for preventing a peer discovery signal collision which may occur in a device-to-device (D2D) communication system, and a wireless device using the method.

Related Art

In a typical cellular communication system, a user equipment always exchanges data with a base station. Therefore, data transmission between user equipments requires a procedure in which data is first delivered from one user equipment to the base station and then is delivered from the base station to another user equipment. In this case, a channel for transmitting data from the user equipment to the base station is called an uplink channel, and a channel for transmitting data from the base station to the user equipment is called a downlink channel. As such, in the data communication between the user equipments in the typical cellular communication system, both of the downlink channel and the downlink channel must be used, and a resource must be allocated to each channel. For this, the base station identifies user equipments within a cell of the base station, forms a data transport channel with the user equipment, and allocates a resource to the data transport channel.

Meanwhile, a device-to-device (D2D) communication system performs communication by directly transmitting data between wireless devices in the absence of the base station. Therefore, D2D communication is also called direct communication. Since a single transport channel is formed between the wireless devices, there is an advantage in that data can be transmitted between the wireless devices by allocating resources only one time. However, since the base station does not exist which forms the transport channel between the wireless devices and allocates the resources to the data transport channel, there is a need for a method of replacing the role of the base station.

SUMMARY OF THE INVENTION

The present invention provides a method for communication between wireless devices, and a wireless device using the method.

The present invention also provides a method for preventing a peer discovery signal collision, and a wireless device using the method.

The present invention also provides a peer discovery frame structure for preventing a peer discovery signal collision.

The present invention also provides a peer discovery signaling method for preventing a peer discovery signal collision, and a wireless device using the method.

The present invention also provides a feedback signaling method capable of reporting a discovery signal collision, when occurred, to a neighboring device, and a wireless device using the method.

In an aspect, a method for communication between wireless devices using a peer discovery slot is provided. The peer discovery slot includes a transmission slot and a response slot. The transmission slot includes a plurality of peer discovery slots. The response slot includes a plurality of response slots. Each of the plurality of response channels corresponds to each of the plurality of peer discovery channels. The method includes transmitting a first peer discovery signal through a first peer discovery channel selected from the plurality of peer discovery channels, receiving a second peer discovery signal transmitted by a neighboring wireless device, confirming a second discovery channel, from which the second peer discovery signal is detected, among the plurality of peer discovery channels, and transmitting a feedback signal through a response channel corresponding to the second peer discovery channel among the plurality of response channels.

The feedback signal may be either a positive feedback signal or a negative feedback signal. The positive feedback signal may indicate that the second peed discovery signal is normally received through the second peer discovery channel, and the negative feedback signal may indicate that a peer discovery signal collision occurs in the second peed discovery channel.

A transmit power of the feedback signal may be determined based on a priority of the neighboring wireless device.

The feedback signal may be the second peer discovery signal.

In another aspect, a method for communication between wireless devices using a peer discovery slot is provided. The peer discovery slot includes a transmission slot and a response slot. The transmission slot includes a plurality of peer discovery slots. The response slot includes a plurality of response slots. Each of the plurality of response channels corresponds to each of the plurality of peer discovery channels. The method includes receiving a first peer discovery signal transmitted by a neighboring wireless device, confirming a first peer discovery channel, for which the first peer discovery signal is detected, among a plurality of peer discovery channels of the first discovery slot, receiving a first feedback signal transmitted by the neighboring wireless device, wherein the first feedback signal is generated based on a peer discovery signal received by the neighboring wireless device, confirming a first response channel, for which the first feedback signal is detected, among a plurality of response channels of the first peer discovery slot, selecting a second peer discovery channel on the basis of the first peer discovery channel and the first response channel among a plurality of peer discovery channels of a second peer discovery slot, and transmitting a second peer discovery signal through the second peer discovery channel.

The method may further include transmitting a second feedback signal through a second response channel corresponding to the first peer discovery channel among a plurality of response channels of the second peer discovery slot.

The feedback signal may be either a positive feedback signal or a negative feedback signal. The positive feedback signal may indicate that the second peed discovery signal is normally received through the second peer discovery channel, and the negative feedback signal may indicate that a peer discovery signal collision occurs in the second peed discovery channel.

A transmit power of the second feedback signal may be determined based on a priority of the neighboring wireless device.

The second feedback signal may be the first peer discovery signal.

In still another aspect, a wireless device for communicating with a neighboring wireless device using a peer discovery slot is provided. The peer discovery slot includes a transmission slot and a response slot. The transmission slot includes a plurality of peer discovery slots. The response slot includes a plurality of response slots. Each of the plurality of response channels corresponds to each of the plurality of peer discovery channels. The wireless device includes a radio frequency (RF) unit configured to transmit and receive a radio signal, and a processor operatively coupled to the RF, implementing a radio interface protocol and configured to receive a first peer discovery signal transmitted by a neighboring wireless device, confirm a first peer discovery channel, for which the first peer discovery signal is detected, among a plurality of peer discovery channels of the first discovery slot, receive a first feedback signal transmitted by the neighboring wireless device, wherein the first feedback signal is generated based on a peer discovery signal received by the neighboring wireless device, confirm a first response channel, for which the first feedback signal is detected, among a plurality of response channels of the first peer discovery slot, select a second peer discovery channel on the basis of the first peer discovery channel and the first response channel among a plurality of peer discovery channels of a second peer discovery slot, and transmit a second peer discovery signal through the second peer discovery channel.

The processor may be configured to transmit a second feedback signal through a second response channel corresponding to the first peer discovery channel among a plurality of response channels of the second peer discovery slot.

The feedback signal may be either a positive feedback signal or a negative feedback signal. The positive feedback signal may indicate that the second peed discovery signal is normally received through the second peer discovery channel, and the negative feedback signal may indicate that a peer discovery signal collision occurs in the second peed discovery channel.

A transmit power of the second feedback signal may be determined based on a priority of the neighboring wireless device.

The second feedback signal may be the first peer discovery signal.

A peer discovery signal collision can be avoided.

If the peer discovery signal collision occurs, it can be reported to a neighboring device.

Information on a peer discovery channel used by a neighboring device can be recognized in a device-to-device (D2D) communication system.

Since the number of rows and the number of columns of a peer discovery channel of a peer discovery slot are not limited, a degree of freedom of transmission resource allocation can be increased in an orthogonal frequency-division multiple access (OFDMA) system.

Since a presence/absence of a neighboring device can be determined by one peer discovery device, a peer discovery loss can be avoided.

DESCRIPTION OF EXEMPLARY EMBODIMENTS

In a typical cellular communication system, a user equipment first reports that it exists in a cell of a base station through a registration procedure with respect to the base station, and acquires several pieces of information to be used for the base station to exchange data with the base station at a later time. Therefore, since the base station is aware of a presence/absence of all user equipments in the cell, each user equipment does not have to confirm a presence/absence of other user equipments. In addition, in data transmission between the user equipments, the base station may determine a presence/absence of a user equipment for receiving data, i.e., a receiving user equipment, and thus may feedback whether data transmission from a user equipment for transmitting the data, i.e., a transmitting user equipment, to the receiving user equipment is possible.

On the other hand, in a device-to-device (D2D) communication system, each wireless device needs to determine which wireless devices are present within a range capable of exchanging data with the wireless device itself. For this, in a D2D frame structure, a periodic peer discovery slot is included, and all D2D devices share the peer discovery slot. One peer discovery slot includes a plurality of peer discovery channels. The peer discovery channel may also be called a peer discovery logical channel.

The wireless device selects a peer discovery channel to be used in a peer discovery slot, and broadcasts a peer discovery signal including its information, i.e., D2D device information such as a device identification, through the peer discovery channel. If the peer discovery channel consists of a single tone or a single symbol, the wireless device transmits specific-level signal power to the peer discovery channel to be used.

In addition, the wireless device receives a peer discovery signal which is broadcast by a different wireless device in the same peer discovery slot. In this case, the wireless device cannot receive a peer discovery signal transmitted by the different wireless device in the time of transmitting the peer discovery signal.

Figure 1:
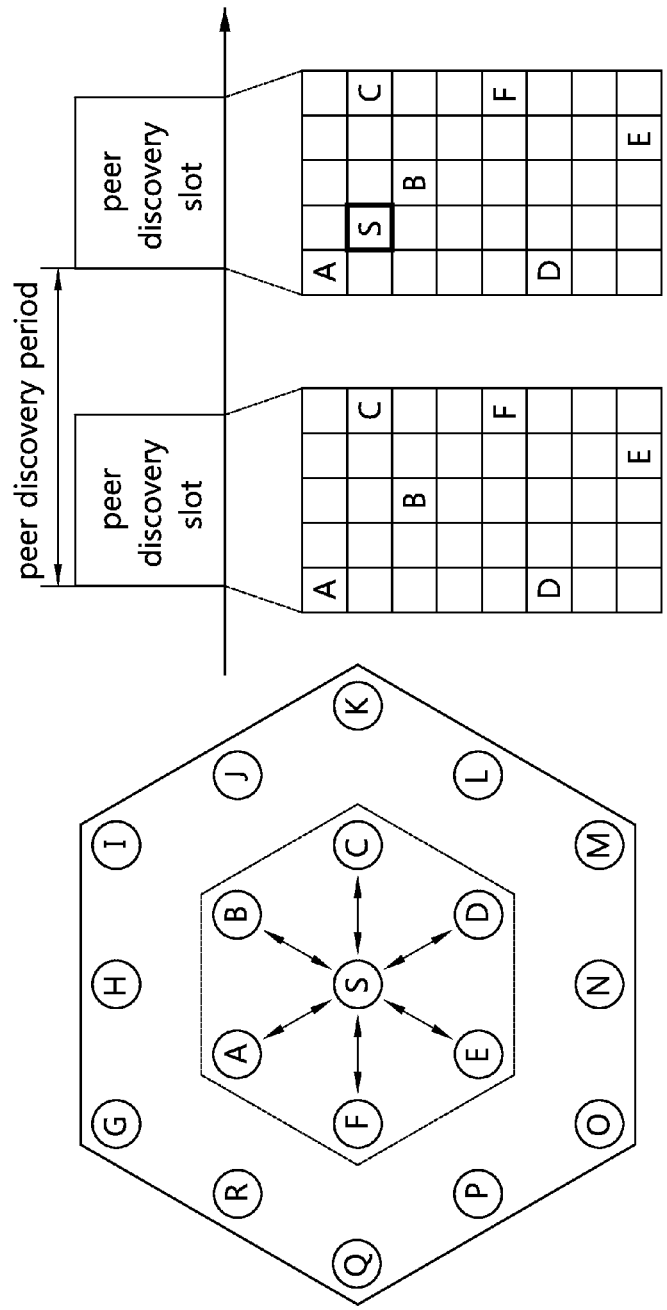
FIG. 1 shows a method of selecting a peer discovery channel by a wireless device in a peer discovery slot.

FIG. 1 shows a method of selecting a peer discovery channel by a wireless device in a peer discovery slot.

In the example of FIG. 1, devices A to R select their peer discovery channels within a peer discovery slot, and broadcast peer discovery signals. A new device S receives a peer discovery slot of a first period in order to select a peer discovery channel for transmitting its peer discovery signal.

The device S can receive the peer discovery signals of the devices A to F. A wireless device from which the device S can receive the peer discovery signal is called a 1-hop neighboring device of the device S.

Likewise, when the device S broadcasts a peer discovery signal, a 1-hop neighboring device of the device S can receive this signal. Therefore, the device S selects a peer discovery channel which is not used by the 1-hop neighboring devices of the device S, i.e., by the devices A to F, in a peer discovery slot of a second period, and broadcasts its peer discovery signal through the peer discovery channel. Hereinafter, for convenience of explanation, a peer discovery slot of a first period is defined as a first peer discovery slot, and a peer discovery slot of a second period is defined as a second peer discovery slot.

Figure 2:
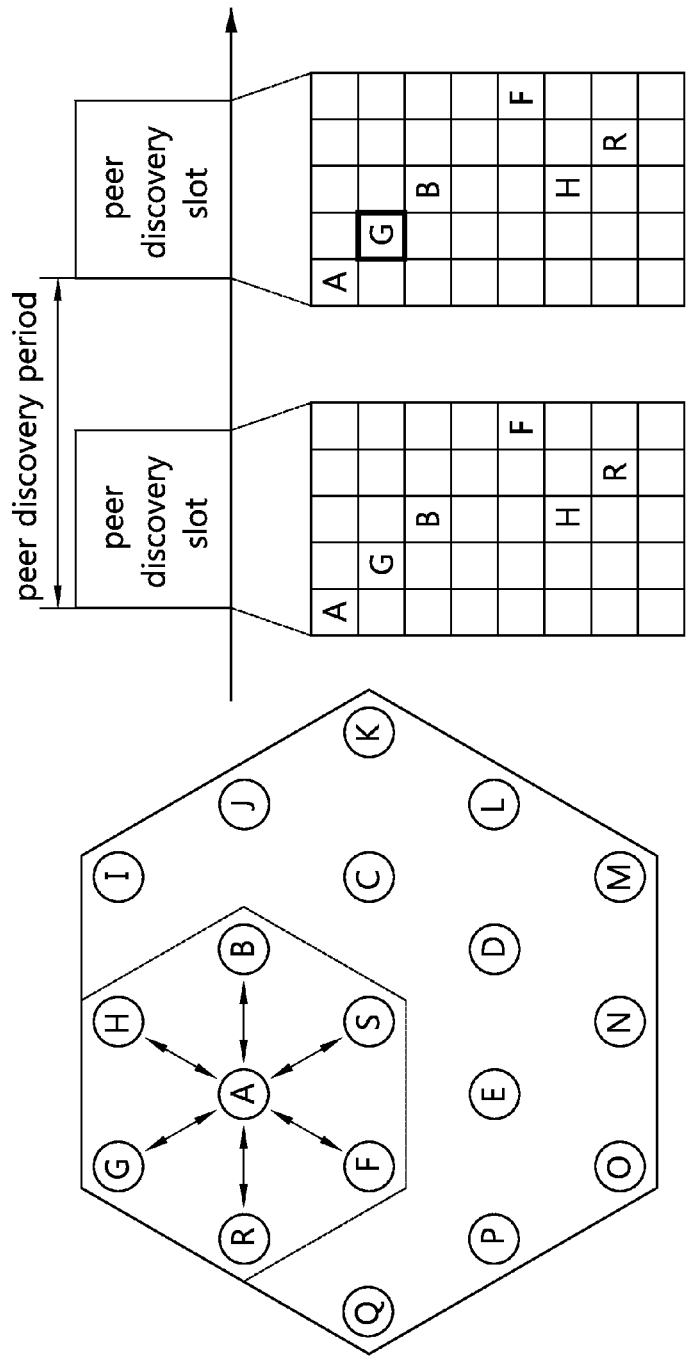
FIG. 2 shows peer discovery signaling of a device A and a neighboring device in the example of FIG. 1.

FIG. 2 shows peer discovery signaling of a device A and a neighboring device in the example of FIG. 1.

Referring to FIG. 2, the device A has devices B, F, G, H, R, and S as a 1-hop neighboring device. Therefore, the device A can receive peer discovery signals of the devices B, F, G, H, R, and S.

In this case, the device S cannot recognize a peer discovery channel used by the devices G, H, and R among 1-hop neighboring devices of the device A. The devices G, H, and R are an example of the 1-hop neighboring device which cannot be recognized by the device S, and are called a 2-hop neighboring device of the device S. In this case, a peer discovery channel selected by the device S on the basis of a peer discovery signal of its 1-hop neighboring device may be a peer discovery channel used by the 2-hop neighboring device of the device S. A phenomenon in which mutual interference occurs when two wireless devices transmit peer discovery signals simultaneously through the same peer discovery channel is called a peer discovery signal collision.

Figure 3:
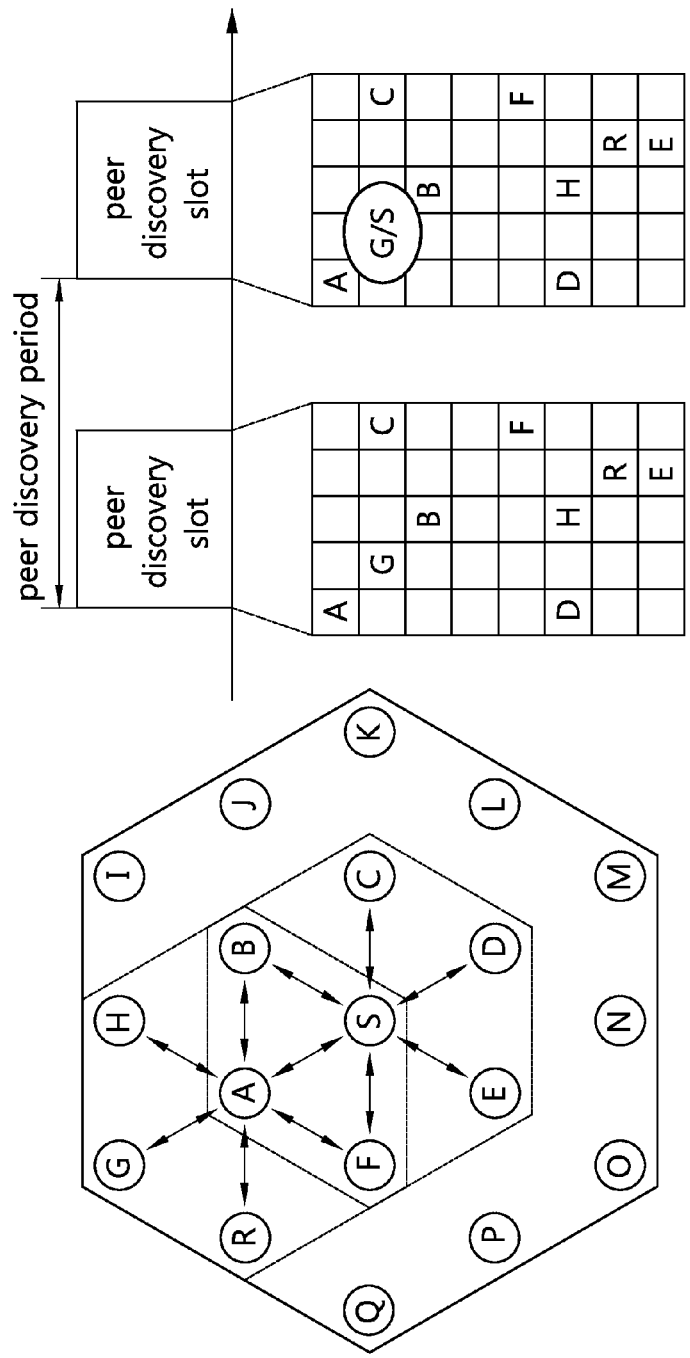
FIG. 3 and FIG. 4 show an example in which a peer discovery signal collision occurs.
Figure 4:
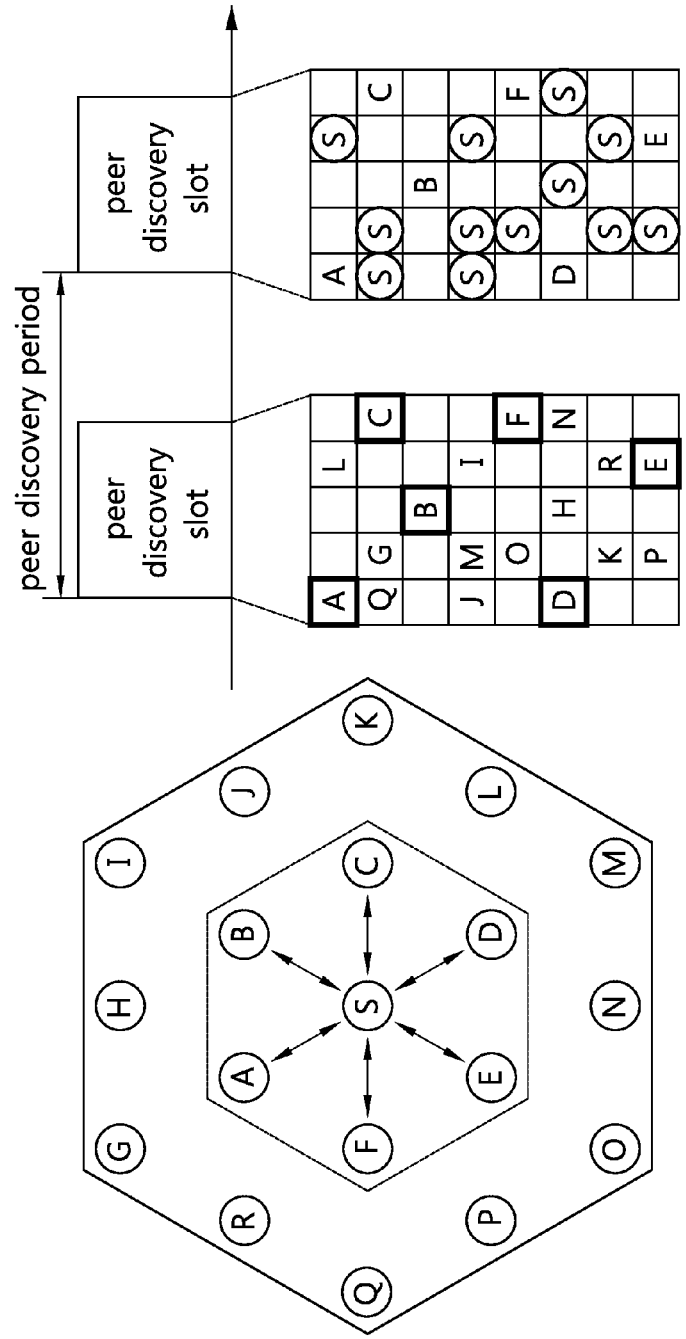

FIG. 3 and FIG. 4 show an example in which a peer discovery signal collision occurs.

In the example of FIG. 3, if a peer discovery channel selected by a device S is a peer discovery channel which has already been used, devices G and S transmit peer discovery signals through the same peer discovery channel in a second peer discovery slot. Therefore, a peer discovery signal collision occurs between the devices G and S, and the device A cannot recognize information of the devices G and S. If the peer discovery signal collision occurs, the device A cannot recognize the two wireless devices until the devices G and S select different peer discovery channels, and has to waste a peer discovery slot of several periods in order to exchange data with the two wireless devices.

In addition, as described above, the device S cannot recognize a peer discovery channel used by 2-hop neighboring devices H to R. In case of selecting a peer discovery channel used by the devices H to R, the peer discovery collision may occur as shown in FIG. 4.

Figure 5:
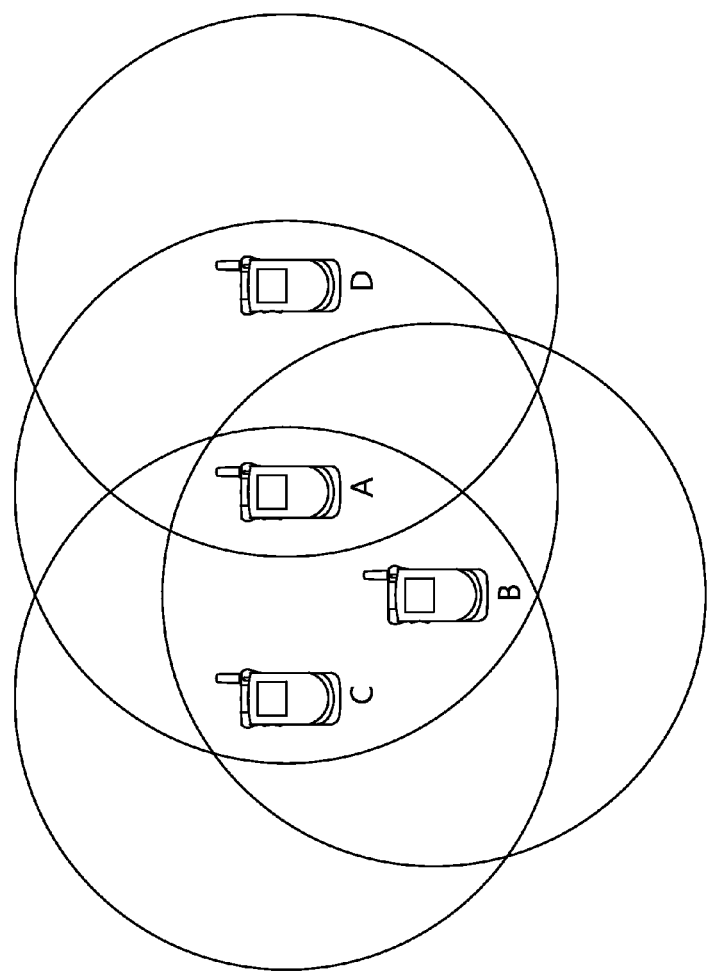
FIG. 5 shows another example in which a peer discovery signal collision occurs.

FIG. 5 shows another example in which a peer discovery signal collision occurs.

If two neighboring wireless devices select a peer discovery channel simultaneously, the devices have almost the same candidate group of available peer discovery channels. In addition, the less the number of available peer discovery channels, the higher the possibility that two wireless devices select the same peer discovery channel.

Referring to FIG. 5, a range capable of performing D2D data communication is defined for each of devices A to D. That is, while the device A can exchange data with the devices B, C, and D, the device D cannot exchange data with the devices B and C and can exchange data only with the device A. If a peer discovery channel selected by the device D is a peer discovery channel used by the device B or C, the device D may generate a peer discovery signal collision with the device B or C.

Meanwhile, if the peer discovery signal collision occurs, the wireless device can recognize this in various manners. For example, each wireless device can recognize the occurrence of the peer discovery signal collision by transmitting a null symbol at a different location of the peer discovery signal.

Figure 6:
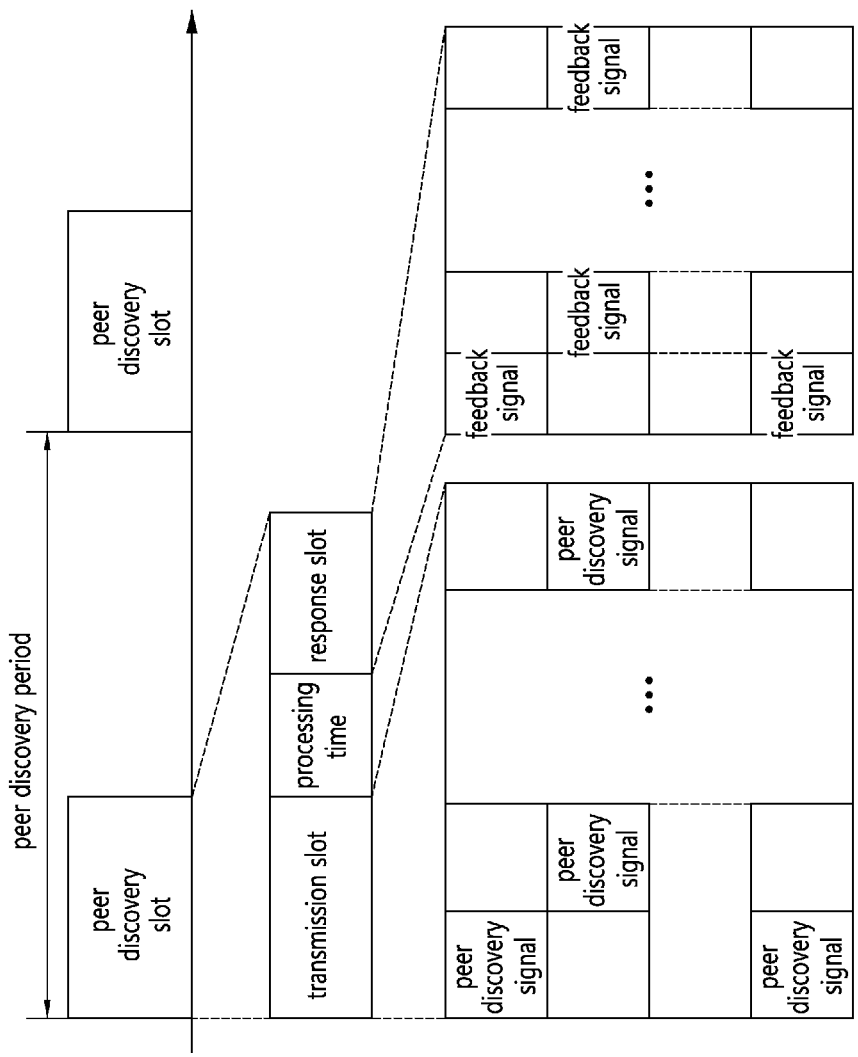
FIG. 6 shows a peer discovery frame structure according to an embodiment of the present invention.

FIG. 6 shows a peer discovery frame structure according to an embodiment of the present invention.

Referring to FIG. 6, a peer discovery slot according to the embodiment of the present invention includes a transmission slot, a response slot, and a processing time. The transmission slot includes a plurality of peer discovery channels. The peer discovery signal is transmitted through the plurality of peer discovery channels. The response slot includes a plurality of response channels one-to-one mapped to the peer discovery channels. In this case, one response channel may consist of a single tone.

The wireless device receives a peer discovery signal in the transmission slot, and confirms a peer discovery channel on which the peer discovery signal is received during a processing time between the transmission slot and the response slot.

For example, the wireless device may list up the peer discovery channel on the basis of whether the peer discovery signal is received.

For another example, the wireless device may confirm information included in the peer discovery signal, and may list up a peer discovery channel on which the peer discovery signal including proper information is received.

For another example, the wireless device may additionally list up a peer discovery channel in which a peer discovery signal collision occurs.

The wireless device broadcasts a feedback signal in the response slot on the basis of the peer discovery channel listed up during the processing time. That is, the wireless device broadcasts the feedback signal through the response channel which is one-to-one mapped to the peer discovery channel on which the peer discovery signal is received. In this case, the wireless device may broadcast the feedback signal also through the response channel corresponding to the peer discovery channel used in transmission of its peer discovery signal in the transmission slot.

Figure 7:
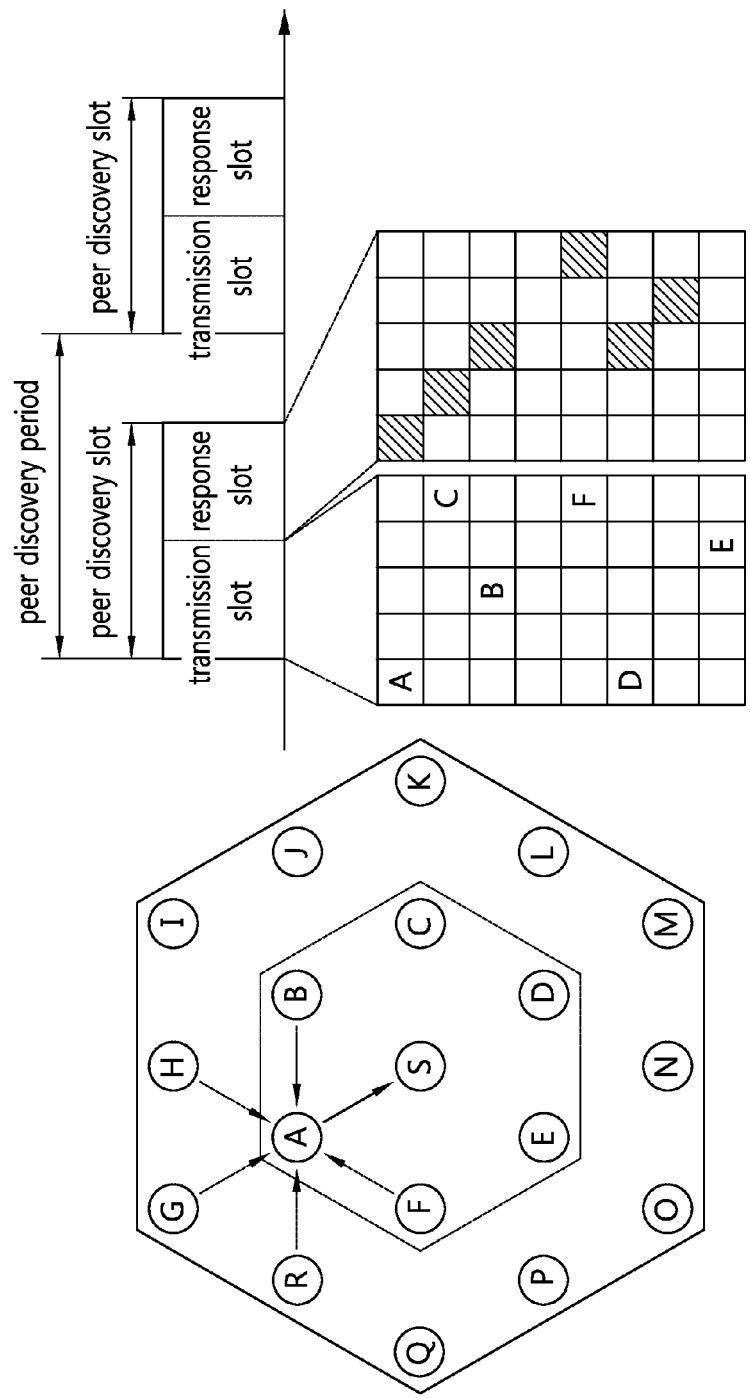
FIG. 7 shows a peer discovery signal and feedback signal received by a wireless device in a peer discovery slot according to an embodiment of the present invention.

FIG. 7 shows a peer discovery signal and feedback signal received by a wireless device in a peer discovery slot according to an embodiment of the present invention.

Referring to FIG. 7, a device S receives a peer discovery signal from devices A to F in a transmission slot. In this case, the device A also receives peer discovery signals transmitted by the devices B, F, G, H, and R in the same transmission slot. The device A confirms a peer discovery channel on which a peer discovery signal is received, and broadcasts a feedback signal through a response channel which is oneto-one mapped to the peer discovery channel on which the peer discovery signal is received in a response slot. The device S receives the feedback signal transmitted by the device A in the same response slot.

Figure 8:
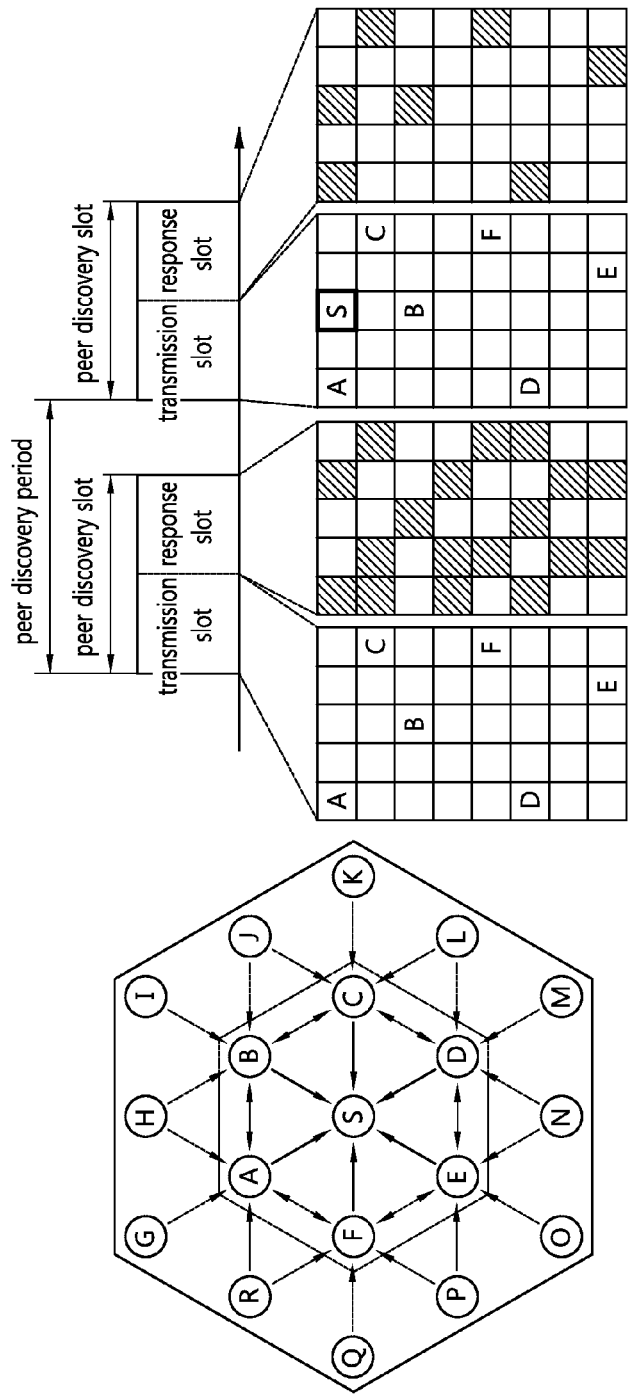
FIG. 8 shows a method of selecting a peer discovery channel by a wireless device in a peer discovery slot according to an embodiment of the present invention.

FIG. 8 shows a method of selecting a peer discovery channel by a wireless device in a peer discovery slot according to an embodiment of the present invention.

A device S receives a peer discovery signal transmitted by a 1-hop neighboring device in a transmission slot of a first peer discovery period. In addition, the device S receives a feedback signal transmitted by a 1-hop neighboring device in a response slot of the first peer discovery period. Therefore, the device S may receive information of a neighboring device capable of performing D2D data communication in the transmission slot, and may acquire information regarding a peer discovery channel in which a peer discovery signal collision may occur, i.e., information regarding a peer discovery channel used by a 2-hop neighboring device, in the response slot.

The device S selects a peer discovery channel corresponding to a channel on which a peer discovery signal and a feedback signal are not received in a transmission slot of a second peer discovery period, and broadcasts the peer discovery signal through the peer discovery channel. In addition, the device S broadcasts the feedback signal through a response channel which is one-to-one mapped to a peer discovery channel on which the peer discovery signal is received in the response slot of the second peer discovery period and/or a peer discovery channel selected by the device S Meanwhile, the wireless device may broadcast the feedback signal in the response slot by dividing it into a positive feedback signal and a negative feedback signal. For example, as to a peer discovery channel on which a peer discovery signal is normally received, a positive feedback signal may be transmitted through a corresponding response channel, and as to a peer discovery channel on which a peer discovery signal is received but for which it is determined that a peer discovery signal collision occurs, a negative feedback signal may be transmitted. Herein, the positive feedback signal implies feedback signaling which uses a positive power level, and the negative feedback signal implies feedback signaling which uses a negative power level.

Figure 9:
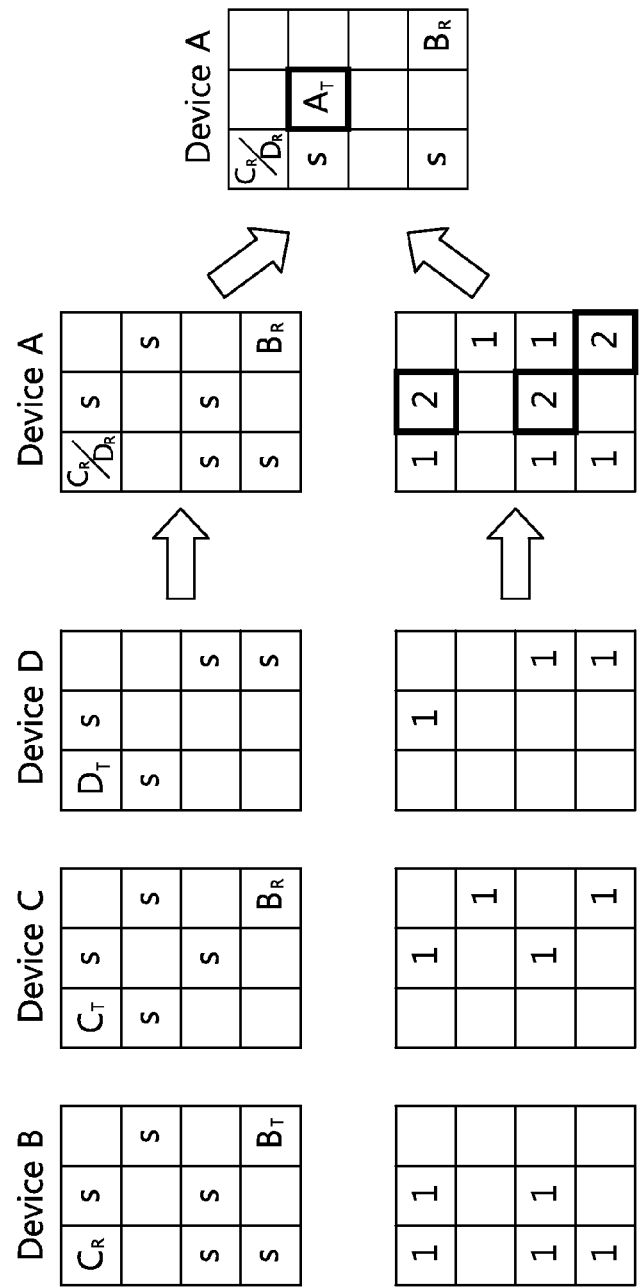
FIG. 9 shows a method of selecting a peer discovery channel by a device A in the example of FIG. 5.

FIG. 9 shows a method of selecting a peer discovery channel by a device A in the example of FIG. 5.

A portion indicated by 's' in a transmission slot of FIG. 9 implies a peer discovery signal received by each wireless device from neighboring devices which exist in a range capable of performing D2D data communication. In addition, a portion indicated by '$X_R$' implies a peer discovery signal received from a device X, and a portion indicated by '$Y_T$' implies a peer discovery signal transmitted by a device Y. For example, a portion indicated by '$B_R$' is a peer discovery signal received from a device B, and a portion indicated by '$C_T$' is a peer discovery signal transmitted by a device C.

A portion indicated by '1' in a response slot of FIG. 9 implies that a peer discovery signal is normally received through a channel of the corresponding portion.

Referring to FIG. 9, among peer discovery signals received by the device A in the transmission slot, peer discovery signals transmitted by the devices C and D are transmitted through the same peer discovery channel. In addition, some of feedback signals received by the device A in the response slot are signals overlapping with a positive feedback signal transmitted from a plurality of wireless devices.

The device A selects its peer discovery channel on the basis of a peer discovery signal received in the transmission slot and a feedback signal received in the response slot.

Figure 10:
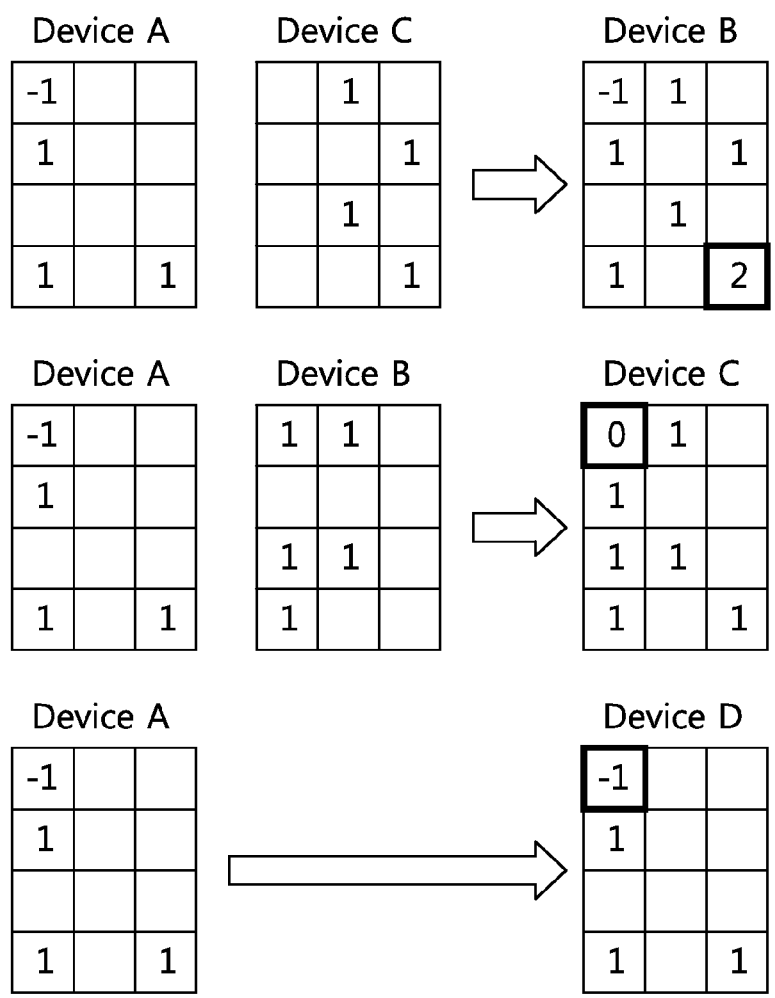
FIG. 10 shows a feedback signal received by each wireless device in a response slot in the example of FIG. 9.

FIG. 10 shows a feedback signal received by each wireless device in a response slot in the example of FIG. 9.

Each wireless device receives the feedback signal from wireless devices within a range capable of performing D2D data communication in the response slot. In this case, the feedback signal may be received in such a format that a plurality of feedback signals overlap.

In the example of FIG. 9, a device B receives the feedback signal from devices A and C. The device B may recognize that a feedback signal received through a peed discovery channel selected by the device B itself in the response slot overlaps with a positive feedback signal transmitted from the devices A and C. The device B determines that the peer discovery signal transmitted by the device B itself is normally received.

The device C receives the feedback signal from the devices A and B. The device A recognizes that a collision occurs with the peer discovery signal of the devices C and D, and transmits a negative feedback signal through a response channel corresponding to a peer discovery channel in which the peer discovery signal collision occurs. On the other hand, the device B transmits a positive feedback signal for the peer discovery signal of the device C since it cannot receive the peer discovery signal of the device D. Therefore, the feedback signal received by the device C through the peer discovery channel selected by the device C itself in the response slot is null. The device C may select a new peer discovery channel under the determination that the devices A and B perform opposite feedback signaling with respect to the peer discovery signal transmitted by the device C itself.

The device D receives the feedback signal only from the device A. The device D may recognize that a negative feedback signal is received through the peer discovery channel selected by the device D itself in the response slot. The device D may select a new peer discovery channel under the determination that a peer discovery signal collision occurs.

Meanwhile, a wireless device may transmit a feedback signal by using various power levels for each response channel. Therefore, the wireless device may transmit the feedback signal by regulating power of the feedback signal according to a priority of a 1-hop neighboring device. That is, a feedback signal for a high-priority neighboring device may be transmitted with strong power, and a feedback signal for a low-priority neighboring device may be transmitted with weak power. The priority may be determined on the basis of power of the discovery signal transmitted by the 1-hope neighboring device. In addition, the priority may be determined by distinguishing a wireless device, for which D2D data communication is currently being performed, and other devices.

As described above, the wireless device may confirm the peer discovery channel used by the 1-hope neighboring device by receiving a peer discovery signal of a first peer discovery slot. In addition, a peer discovery channel used by a 2-hop neighboring device may be confirmed by receiving a feedback signal of the first peer discovery slot. However, the number of peer discovery channels that can be used by the wireless device may be insufficient, or all peer discovery channels may be in use. In this case, a new device may select a peer discover channel having lowest power of a feedback signal received in a response slot as its peer discovery channel among empty peer discovery channels in a transmission slot.

If the feedback signal for the peer discovery channel is transmitted with the same power, the power of the feedback signal received in the new device is identical in all peer discovery channels. On the other hand, if the feedback signal for the peer discovery channel is transmitted with different transmit power according to a priority, the power of the feedback signal received in the new wireless device differs for each peer discovery channel. By selecting the peer discovery channel on the basis of the priority, the new device can minimize a problem of a peer discovery collision which may occur when the number of available peer discovery channels is insufficient.

Figure 11:
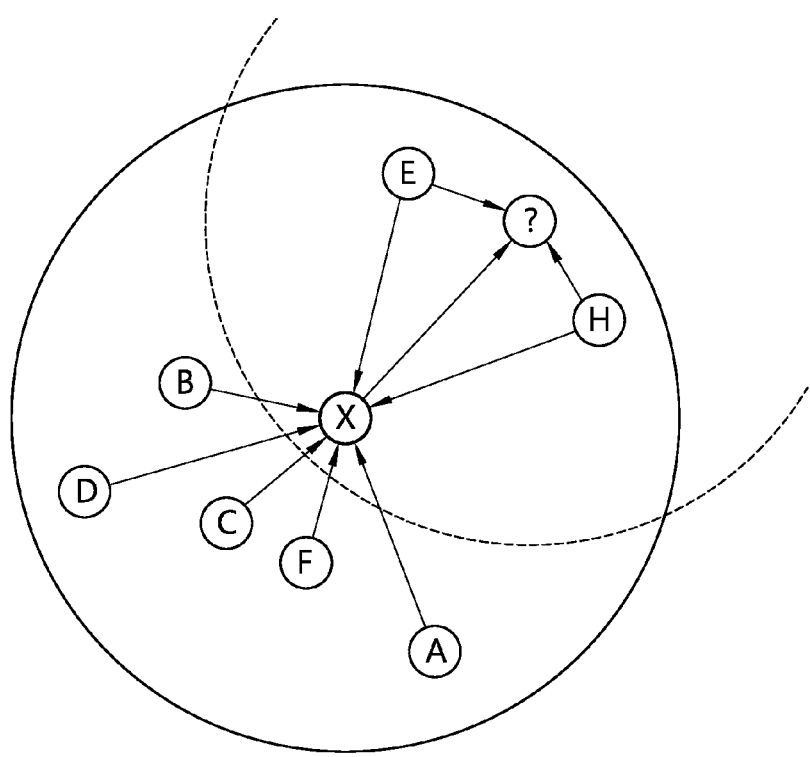
FIG. 11 shows any wireless device X and a 1-hop neighboring device.
Figure 12:
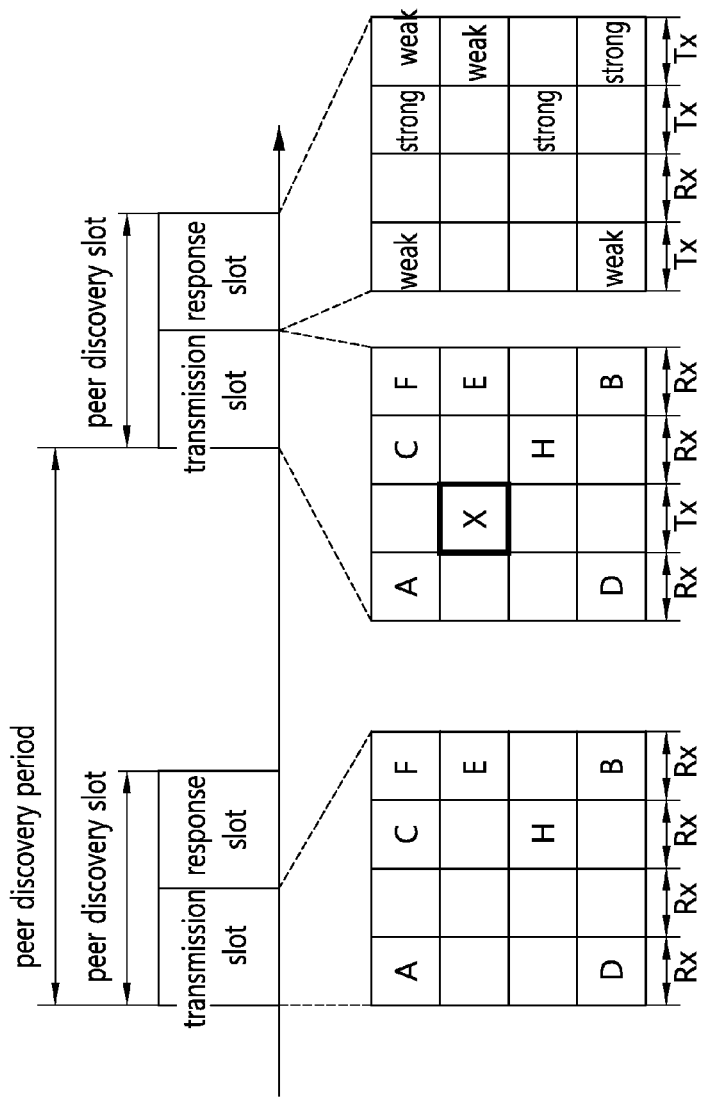
FIG. 12 shows a peer discovery signal and feedback signal transmitted by a wireless device X in the example of FIG. 11.

FIG. 11 shows any wireless device X and a 1-hop neighboring device, and FIG. 12 shows a peer discovery signal and feedback signal transmitted by a wireless device X in the example of FIG. 11.

Referring to FIG. 11, there are devices A to H around the device X within a 1-hop range. The device X receives a peer discovery signal transmitted by the 1-hop neighboring devices A to H. Hereinafter, it is assumed that the devices B, C, and F are assigned a higher priority than the device X, and the devices A, D, E, and H are assigned a higher priority than the device X.

Referring to FIG. 12, the device X selects a peer discovery channel for transmitting its peer discovery signal in a transmission slot of a second peer discovery period, and transmits a feedback signal by regulating strength of a feedback signal according to a priority in the response slot. That is, the device X transmits a feedback signal with great power for a peer discovery channel used by the devices B, C, and F having a high priority, and transmits a feedback signal with low power for a peer discovery channel used by the devices A, D, E, and H having a low priority.

In order to transmit the feedback signal by regulating transmit power, the wireless device may set the transmit power of the feedback signal to a plurality of levels, and may transmit the feedback signal by selecting the power level according to a priority of neighboring devices. For example, the feedback signal is transmitted with a relatively high power level through a peer discovery channel used by a neighboring device having a high priority, and the feedback signal is transmitted with a relatively low power level through a peer discovery channel used by a neighboring device having a low priority.

Meanwhile, during a wireless device transmits its peer discovery signal, the wireless device cannot receive a peer discovery signal transmitted by another wireless device. In other words, the wireless device cannot receive a peer discovery signal transmitted through a peer discovery channel located in the same time as a peer discovery channel selected by the device itself. Referring back to FIG. 4, the devices B and H are located within a 1-hop range from each other, but the peer discovery channel in use is located in the same time. Therefore, the devices B and H cannot receive peer discovery signals of their corresponding devices, which is called a peer discovery loss.

In order to avoid the peer discovery loss, a typical D2D communication system uses peer discovery channel hopping so that wireless devices which use peer discovery channels located in the same time use peer discovery channel located in different time slots at a next peer discovery period. The peer discovery channel hopping implies that a peer discovery signal is transmitted by performing channel shifting on all peer discovery channels by a mutually different offset on a row basis. The offset may be set by using a square matrix such as a Latin square matrix.

Figure 13:
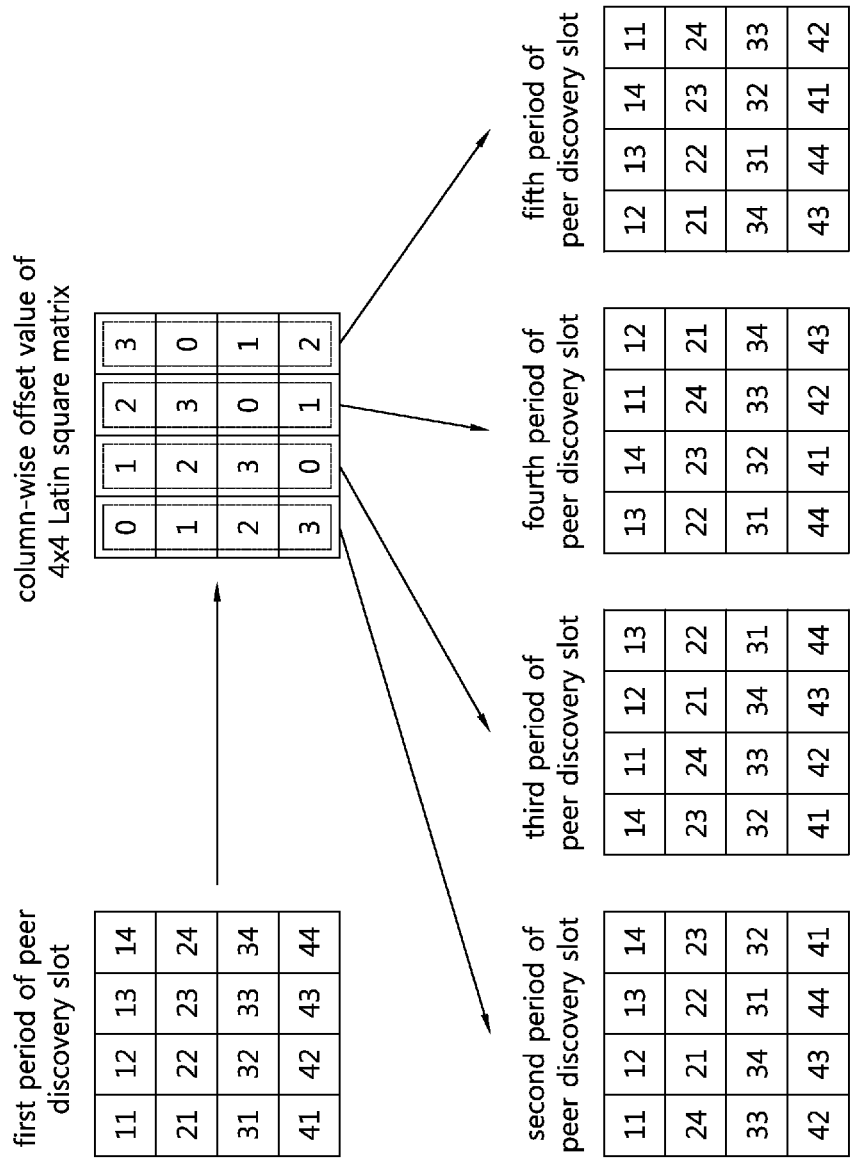
FIG. 13 shows peer discovery channel hopping using a 4'4 Latin square matrix.

FIG. 13 shows peer discovery channel hopping using a 4·4 Latin square matrix.

Referring to FIG. 13, the number Nr of rows and the number Nc of columns of a peer discovery channel of a peer discovery slot are both 4. Any two peer discovery channels existing in the same column in a first period exist in different columns during four peer discovery periods from a second period to a fifth period according to the peer discovery channel hopping. That is, any two peer discovery channels exist in different columns during Nc peer discovery periods.

However, if the number Nr of rows of the peer discovery channel is greater than the number Nc of columns, the peer discovery channel hopping using the Latin square matrix does not guarantee the Nc peer discovery periods. That is, the two peer discovery channels exist in the same column before an (Nc+1)th period. Meanwhile, in a current orthogonal frequency-division multiple access (OFDMA) system, the number of tones of a frequency domain is greater than the number of tones in a time domain. Therefore, the condition that the number Nc of the columns must be greater than or equal to the number Nr of the rows causes a significant restriction when configuring a peer discovery slot.

In addition, there is a disadvantage in that the peer discovery channel hopping can receive a peer discovery signal of all 1-hop neighboring devices only when at least two or more peer discovery periods are used.

Figure 14:
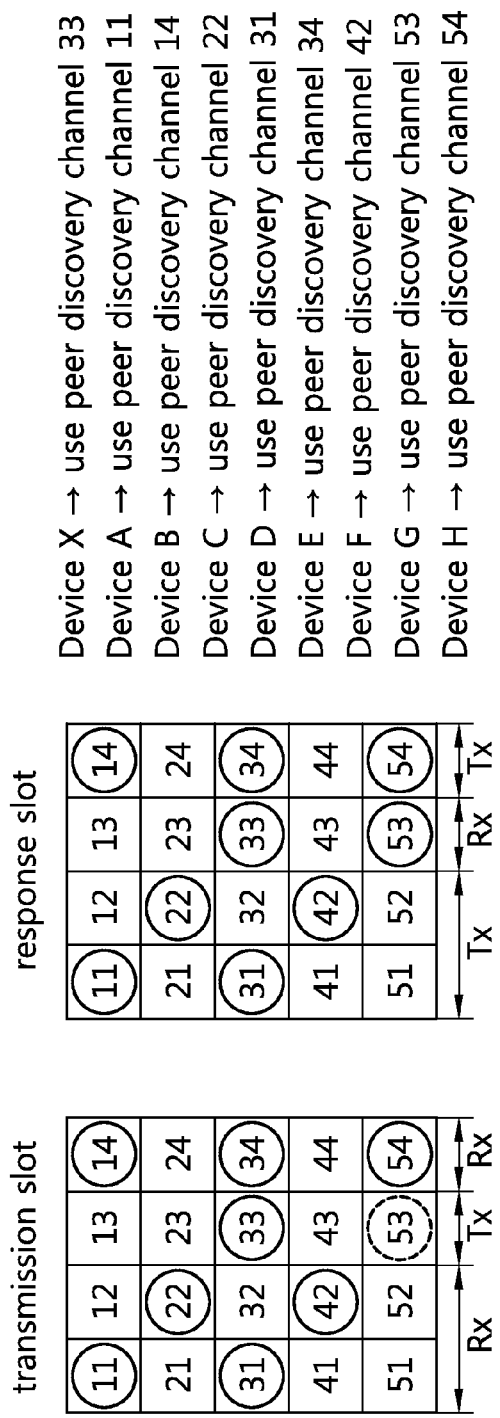
FIG. 14 shows peer discovery signaling according to an embodiment of the present invention.

FIG. 14 shows peer discovery signaling according to an embodiment of the present invention.

Referring to FIG. 14, a device X transmits a peer discovery signal by using a peer discovery channel '33'. In addition, devices A to H transmit the peer discovery signal in a transmission slot of the same peer discovery period. As described above, during its peer discovery signal is transmitted, a wireless device cannot receive a peer discovery signal transmitted by another device. Therefore, a peer discovery loss occurs in which during its peer discovery signal is transmitted, the device X cannot receive a peer discovery signal of a device G.

However, the peer discovery loss can be avoided by receiving a feedback signal for a peer discovery channel located in the same time as the peer discovery channel discovered by the device itself. Referring back to FIG. 14, in a response slot, the device X directly transmits the peer discovery signal received in the transmission slot. In addition, in the response slot, the device X receives a peer discovery signal for peer discovery channels '13', '23', '43', and '53' located in the same time as the peer discovery channel '33'.

Therefore, the device X may acquire information on the device G by using a feedback signal for the device G.

Table 1 shows a signaling method of a new device and an old device in a first peer discovery slot when using a discovery signaling method according to an embodiment of the present invention.

TABLE 1

| | First peer discovery slot | |
|---|---|---|
| New device | Transmission slot | Peer discovery signal reception |
| | Response slot | Feedback signal reception |
| Old device | Transmission slot | Peer discovery signal transmission/reception |
| | Response slot | Feedback signal transmission (or feedback signal transmission/reception) |

Referring to Table 1, a new device receives a peer discovery signal from a neighboring device in a transmission slot of a first peer discovery slot. In addition, the new device receives a feedback signal from the neighboring device in a response slot. As described above, the peer discovery slot includes the transmission slot and the response slot. The transmission slot includes a plurality of peer discovery channels, and the response slot includes a plurality of response channels. The plurality of response channels correspond to the plurality of peer discovery channels. The peer discovery signal is transmitted through the peer discovery channel, and the feedback signal is transmitted through the response channel.

Meanwhile, the legacy device, that is, the existing wireless device in the D2D communication system, receives a peer discovery signal from a neighboring device in a transmission slot of a first peer discovery slot, and transmits its peer discovery signal to the neighboring device. In addition, the legacy device transmits a feedback signal to the neighboring device in the response slot. In this case, the legacy device may receive a feedback signal for a peer discovery channel located in the same time as the peer discovery channel selected by the legacy device itself.

The feedback signal is generated on the basis of the peer discovery signal received by the wireless device from the neighboring device in the transmission slot. That is, the wireless device confirms a peer discovery channel in which a peer discovery signal is detected, and transmits a feedback signal through a response channel corresponding to the peer discovery channel.

In this case, the wireless device may transmit the feedback signal through a response channel corresponding to a peer discovery channel selected by the wireless device itself.

In this case, the feedback signal may be transmitted by distinguishing a positive feedback signal and a negative feedback signal on the basis of a state of a channel in which a peer discovery signal is detected. For example, if the peer discovery signal is normally received through the peer discovery channel, the positive feedback signal may be transmitted, and if a peer discovery signal collision occurs in the peer discovery channel, the negative feedback signal may be transmitted.

In this case, the feedback signal may be transmitted with different transmit power on the basis of a priority of a neighboring device.

In this case, the feedback signal may be a peer discovery signal received by the wireless device. In the above case, the wireless device may receive a feedback signal for a peer discovery channel located in the same time as a peer discovery channel selected by the wireless device itself in the response slot.

Table 2 shows a signaling method of a new device and an old device in a second peer discovery slot when using a peer discovery signaling method according to an embodiment of the present invention.

TABLE 2

| | Second peer discovery slot | |
|---|---|---|
| New device | Transmission slot | Peer discovery signal transmission/reception |
| | Response slot | Feedback signal transmission (or feedback signal transmission/reception) |
| Old device | Transmission slot | Peer discovery signal transmission/reception |
| | Response slot | Feedback signal transmission (or feedback signal transmission/reception) |

Referring to Table 2, a new device confirms a peer discovery channel in which a peer discovery signal is detected and a response channel in which a feedback signal is detected, and selects its peer discovery channel on the basis of the peer discovery channel and the response channel. In addition, the new device transmits the peer discovery signal through the peer discovery channel selected by the new device itself in a transmission slot.

Meanwhile, the new device transmits a feedback signal through a neighboring device in a response slot. In this case, the new device may receive a feedback signal for a peer discovery channel located in the same time as the peer discovery channel selected by the new device itself.

The feedback signal is generated on the basis of the peer discovery signal received by the new device from the neighboring device in the transmission slot. That is, the new device transmits the feedback signal through a response channel corresponding to a peer discovery channel in which a peer discovery signal is detected.

In this case, the new device may transmit the feedback signal through a response channel corresponding to the peer discovery channel selected by the new device itself.

In this case, the feedback signal may be transmitted by distinguishing a positive feedback signal and a negative feedback signal on the basis of a state of a channel in which a peer discovery signal is detected. For example, if the peer discovery signal is normally received through the peer discovery channel, the positive feedback signal may be transmitted, and if a peer discovery signal collision occurs in the peer discovery channel, the negative feedback signal may be transmitted.

In this case, the feedback signal may be transmitted with different transmit power on the basis of a priority of a neighboring device.

In this case, the feedback signal may be a peer discovery signal received by the new device. In the above case, the new device may receive a feedback signal for a peer discovery channel located in the same time as a peer discovery channel selected by the new device itself in the response slot.

Figure 15:
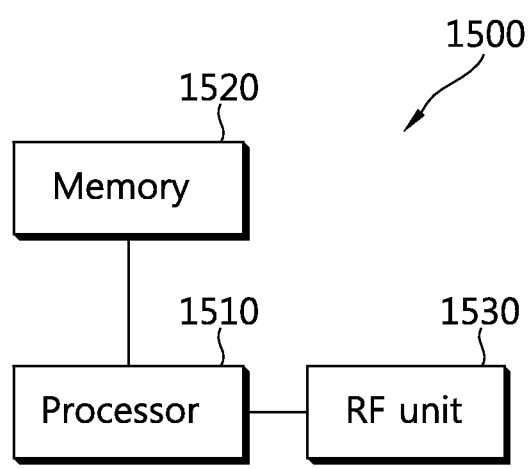
FIG. 15 is a block diagram showing a wireless device according to an embodiment of the present invention.

FIG. 15 is a block diagram showing a wireless device according to an embodiment of the present invention.

A wireless device 1500 includes a processor 1510, a memory 1520, and a radio frequency (RF) unit 1530. The memory 1520 is coupled to the processor 1510, and stores a variety of information for driving the processor 1510. The RF unit 1530 is coupled to the processor 1510, and transmits and/or receives a radio signal.

The processor 1510 implements the proposed functions, procedures, and/or methods. In the embodiment of the present invention, the operation of the wireless device may be implemented by the processor 1510. For example, in the embodiment of Table 1 and Table 2, the operation of the wireless device may be implemented by the processor 1510.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communication between wireless devices using a peer discovery slot, the method comprising:
   receiving a first peer discovery signal, transmitted by a neighboring wireless device, through a plurality of peer discovery channels within a transmission slot of a first peer discovery period;
   receiving a first feedback signal, transmitted by the neighboring wireless device, through a plurality of response channels within a response slot of the first peer discovery period,
   wherein the first feedback signal is generated based on a peer discovery signal received by the neighboring wireless device;
   selecting a peer discovery channel among the plurality of peer discovery channels based on the received first peer discovery signal and the first feedback signal;
   transmitting a second peer discovery signal through the plurality of peer discovery channels within the transmission slot of a second peer discovery period,
   wherein the second peer discovery signal is generated based on the selected peer discovery channel; and
   transmitting a second feedback signal within the response slot of the second peer discovery period,
   wherein the peer discovery slot is configured with the transmission slot, the response slot, and a processing time,
   wherein the transmission slot is configured with the plurality of peer discovery channels for transmitting/receiving the plurality of peer discovery signals,
   wherein the response slot is configured with the plurality of response channels that is one-to-one mapped to the plurality of peer discovery channels,
   wherein one response channel of the plurality of response channels consists of a single tone, and
   wherein the selected peer discovery channel is indicated during the processing time between the transmission slot and the response slot.

2. The method of claim 1, wherein the second feedback signal is either a positive feedback signal or a negative feedback signal, wherein the positive feedback signal indicates that the first peer discovery signal is normally received through the plurality of first peer discovery channels, and wherein the negative feedback signal indicates that a peer discovery signal collision occurs in the plurality of peer discovery channels.

3. The method of claim 1, wherein a transmit power of the second feedback signal is determined based on a priority of the neighboring wireless device.

4. The method of claim 1, wherein the second feedback signal corresponds to the first peer discovery signal.

5. A wireless device for communicating with a neighboring wireless device using a peer discovery slot, the wireless device comprising:
   a radio frequency (RF) unit that transmits and receives a radio signal; and
   a processor that controls the RF unit to:
   receive a first peer discovery signal, transmitted by a neighboring wireless device, through a plurality of peer discovery channels within a transmission slot of a first peer discovery period;
   receive a first feedback signal, transmitted by the neighboring wireless device, through a plurality of response channels within a response slot of the first peer discovery period,
   wherein the first feedback signal is generated based on a peer discovery signal received by the neighboring wireless device;
   select a peer discovery channel among the plurality of peer discovery channels based on the received first peer discovery signal and the first feedback signal;
   transmit a second peer discovery signal through the plurality of peer discovery channels within the transmission slot of a second peer discovery period,
   wherein the second peer discovery signal is generated based on the selected peer discovery channel; and
   transmit a second feedback signal within the response slot of the second peer discovery period,
   wherein the peer discovery slot is configured with the transmission slot, the response slot, and a processing time,
   wherein the transmission slot is configured with the plurality of peer discovery channel for transmitting/receiving the plurality of peer discovery signals,
   wherein the response slot is configured with the plurality of response channels that is one-to-one mapped to the plurality of peer discovery channels,
   wherein one response channel of the plurality of response channels consists of a single tone, and
   wherein the selected peer discovery channel is indicated during the processing time between the transmission slot and the response slot.

6. The wireless device of claim 5, wherein the second feedback signal is either a positive feedback signal or a negative feedback signal, wherein the positive feedback signal indicates that the first peer discovery signal is normally received through the plurality of peer discovery channel, and wherein the negative feedback signal indicates that a peer discovery signal collision occurs in the plurality of peer discovery channels.

7. The wireless device of claim 5, wherein a transmit power of the second feedback signal is determined based on a priority of the neighboring wireless device.

8. The wireless device of claim 5, wherein the second feedback signal is the first peer discovery signal.

* * * * *